(12) United States Patent
Wehrlen et al.

(10) Patent No.: US 7,239,965 B2
(45) Date of Patent: Jul. 3, 2007

(54) METHOD AND SYSTEM FOR GOLF CART CONTROL

(75) Inventors: David J. Wehrlen, Austin, TX (US); Joseph M. Hill, III, Austin, TX (US); David J. Mullinix, Austin, TX (US)

(73) Assignee: Uplink Corporation, Austin, TX (US)

( * ) Notice: Subject to any disclaimer, the term of this patent is extended or adjusted under 35 U.S.C. 154(b) by 631 days.

(21) Appl. No.: 10/754,916

(22) Filed: Jan. 9, 2004

(65) Prior Publication Data

US 2004/0260467 A1    Dec. 23, 2004

Related U.S. Application Data

(60) Provisional application No. 60/440,894, filed on Jan. 17, 2003.

(51) Int. Cl.
 *G01C 21/00* (2006.01)

(52) U.S. Cl. ........................ 701/213; 701/208

(58) Field of Classification Search .................. 701/1, 701/23–26, 201–213; 342/357.01–357.08
See application file for complete search history.

(56) References Cited

U.S. PATENT DOCUMENTS

| | | | | |
|---|---|---|---|---|
| 6,456,938 B1 * | 9/2002 | Barnard | ....................... | 701/213 |
| 6,470,242 B1 * | 10/2002 | Rudow et al. | .................. | 701/1 |
| 6,525,690 B2 * | 2/2003 | Rudow et al. | ......... | 342/357.13 |
| 6,691,032 B1 * | 2/2004 | Irish et al. | ................... | 701/213 |
| 2006/0052918 A1 | 3/2006 | McLeod et al. | ............... | 701/29 |

OTHER PUBLICATIONS

U.S. Appl. No. 60/365,339 entitled "Remote Diagnostic System for Electric Vehicles" naming Dr. George T. Hummert, Russell W. King, David Nadler, Paul W. McLeod and Norman R. Padgett as inventors, and filed on Mar. 18, 2002.

* cited by examiner

*Primary Examiner*—Richard M. Camby
(74) *Attorney, Agent, or Firm*—Hamilton & Terrile, LLP; Robert W. Holland

(57) ABSTRACT

Golf cart movements at a golf course are controlled by a limited access controller that compares a golf cart's GPS-determined position against a limited access map to restrict performance of inputs by the golf cart's driver to the golf cart's motor under predetermined conditions, such as if a golf cart enters or has a predetermined likelihood of entering a limited access area. The limited access controller inhibits motor responses, such as by preventing motor operation, limiting available motor speeds, or allowing motor operation only in a vector that removes the golf cart from the limited access area, such as operation in reverse. Golf carts of a golf course communicate with a base station that updates the limited access map by defining limited access area perimeters and allowable actions within a limited access area and that directly commands allowable motor operations. For example, golf carts are prohibited from entering green areas, are restricted to golf cart paths during cart-path-only periods, and are restricted to reduced speeds in driving hazard areas.

33 Claims, 4 Drawing Sheets

METHOD AND SYSTEM FOR GOLF CART CONTROL

RELATED APPLICATIONS

This application claims priority to and incorporates by reference U.S. Provisional Patent Application Ser. No. 60/440,894, entitled "Golf Cart Monitoring and Management System," filed Jan. 17, 2003.

BACKGROUND OF THE INVENTION

1. Field of the Invention

The present invention relates in general to the field of vehicle control, and more particularly to a method and system for control of a golf cart based on location of the golf cart.

2. Description of the Related Art

Golf course owners generally make a substantial financial investment in a golf course in order to develop and maintain the appearance and quality of play expected by golfers. A significant portion of the investment is made in the preparation and maintenance of golfing areas such as greens, fairways and golfing hazards. In addition to the financial investment made to develop and maintain golfing areas, a substantial investment is made in the time that it typically takes for grass and other greenery to grow and mature into acceptable playing surfaces. Another significant portion of the investment made in a golf course is the equipment and maintenance needed to keep a golf course operating on a daily basis, including the purchase and maintenance of golf carts for golfers to drive. Generally, golf courses protect the grounds and equipment with a marshal who keeps watch over golfers and attempts to ensure that golfers maintain a desired pace of play. However, golf courses are typically large areas with hills and foliage that makes a marshal's job difficult to accomplish. In a relatively short period of time, a thoughtless golfer can create considerable damage to sensitive golfing areas, such as greens, simply by driving a golf cart in the wrong place, such as locations having wet turf that is particularly susceptible to damage. Inattentive and even malicious golf cart drivers can cause even greater amounts of damage and also present a safety hazard by driving too fast or recklessly near other golfers or natural hazards, such as cliffs, water, steep inclines or sharp turns.

One solution that aids in the monitoring of golf course activity by a marshal is the use of golf carts equipped with positioning equipment, such as Global Positioning System ("GPS") equipment. GPS positions of a golf cart are compared with a map of the golf course so that the golfer knows his position for play, such as distance from the green, and is given tips and instructions for more efficient play. GPS positions available at a golf cart can be used to inform a golf cart driver when the golf cart travels to an unauthorized location and may be stored for later analysis to identify the source of damage caused on a golf course by a golf cart. However, even if a marshal knows the location of a golf cart on a golf course and foresees the potential for damage to the golf course or injury to the golf cart driver, the marshal is unlikely to be close enough to the golf cart to preempt the damage or driving safety hazard.

SUMMARY OF THE INVENTION

Therefore a need has arisen for a method and system which applies a golf cart's GPS position on a golf course to preempt or otherwise reduce damage from golf cart movement.

A further need exists for a method and system which defines areas of a golf course to which golf carts have limited access imposed by restrictions on golf cart movements within or proximate to the limited access areas.

In accordance with the present invention, a method and system are provided which substantially reduce the disadvantages and problems associated with previous methods and systems for managing and controlling golf cart movements on a golf course. A golf cart's position is compared with defined limited access areas of a golf course so that the golf cart's movements are restricted if the golf cart violates a limited access area. Golf cart movement restrictions are defined by golf cart position relative to a limited access area and other factors such as the type of limited access area, the golf cart type, golf course conditions, time of day, and defined access codes. Golf cart movement restrictions include a prohibition against any movement, a prohibition of movement in defined areas, a prohibition of movement in a defined gear, such as forward or reverse, and a limitation of golf cart speeds, such as a specific maximum speed.

More specifically, a limited access controller installed on a golf cart communicates with a GPS receiver and a limited access area map to analyze golf cart GPS or dead reckoning position and velocity information and impose restrictions on golf cart movement if a limited access area is violated. The limited access area controller interfaces with the golf cart motor controller to override driver inputs to the motor, such as overriding driver accelerator commands for a selected forward speed by imposing a reduced forward speed or prohibiting movement by switching off the motor current supply. The limited access controller communicates movement restrictions through a driver interface for display to the golf cart driver and through a wireless network to a base station for notice to golf course personnel. A limited access configuration module associated with the base station provides a graphical user interface for defining limited access areas and associated movement restrictions and for deploying selected limited access areas for activation on one or more golf carts through a wireless network. Limited access areas are selectively activated based on time of day and course conditions. The base station also displays golf cart position and status information and permits direct application of golf cart movement restrictions to one or more golf carts through the wireless network.

The present invention provides a number of important technical advantages. One example of an important technical advantage is that a golf cart's GPS position on a golf course is applied to preempt damage to the golf course or injury to golfers from golf cart movement. The limited access controller automatically imposes restrictions on a golf cart's movement by overriding driver accelerator inputs to the golf cart motor if the golf cart is positioned to enter a limited access area, such as an area in which damage is likely to occur to the golf course or the risk of injury to a golfer is increased. The limitations imposed on a golf cart's movement are tailored to the type of golf cart, type of limited access area and the projected golf cart path based on GPS positioning or dead reckoning, and notice of golf cart movement restrictions are displayed to the golf cart's driver and communicated to golf course personnel. Thus, golf cart drivers are provided with ample opportunity to avoid limited access areas without substantial interference with a golf game or driver duties, and golf course management are provided with a convenient system for managing golf cart movement on a golf course that reduces incidents of damage, injury and theft, and also educates golfers on proper golf course procedures.

Another example of an important technical advantage of the present invention is the simplified definition and imposition of areas of a golf course to which golf carts have limited access enforced by restrictions on golf cart movements within or proximate to the limited access areas. A graphical user interface presents a map of the golf course for defining the perimeters of limited access areas and associating golf cart movement restrictions with the limited access areas. Active limited access areas are distributed to golf carts through a wireless network so that golf course management may adapt the limited access areas as golfing conditions change, including the type of restrictions, such as golf cart speed restrictions for an associated limited access area, the identity of limited access areas, such as transitions to and from golf cart path only conditions, or the golf carts to which restrictions apply, such as golf carts in use by golfers versus golf carts in use by golf course staff, such as the marshal, beverage distributors or utility workers and golf carts used by handicapped golfers who may need access by golf cart to limited access areas due to health concerns. Management of golf carts by GPS position, authorization codes and time of day decreases incidence of theft of golf carts during off hours and unauthorized golf course use.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Golf cart movements on a golf course are managed by defining limited access areas with associated golf cart movement restrictions. A golf cart's position is determined with a GPS receiver and compared with a limited access area map to determine if a limited access area has been entered or a violation is likely. Limited access area violations are managed by restricting movement of the golf cart to prevent or minimize the violations, or issuing visual and/or audible alerts to a golfer or to course personnel. For instance, driver inputs to command a desired speed from a golf cart motor are overridden, such as by preventing golf cart movement in one or more directions, above a defined speed or in a defined gear. Golf cart movement restrictions protect golf course features that are susceptible to damage, such as greens or even off-cart-path areas during wet weather. Golf cart movement restrictions also help to prevent injury to golfers and golf cart drivers by restricting maximum speeds during driving events susceptible to accidents, such as on steep grades, during sharp turns and in crowded areas. Comparisons between on-board position determinations and defined limited access area maps automatically restrict golf cart movements to preempt violations of limited access areas without intervention by golf course personnel.

Figure 1:
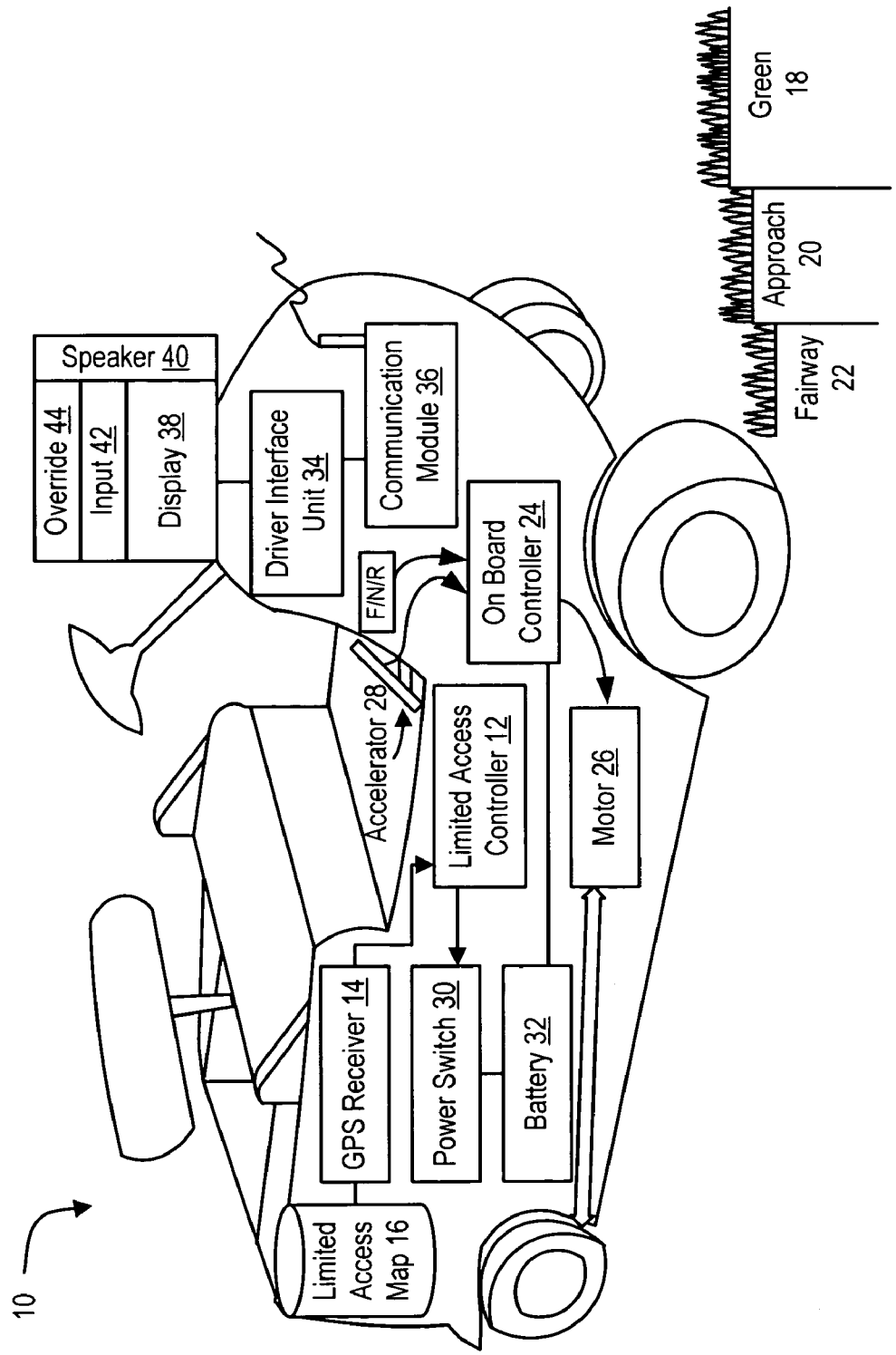
FIG. 1 depicts a functional block diagram of a golf cart having a limited access controller.

Referring now to FIG. 1, a functional block diagram depicts a golf cart 10 in which movement of the golf cart in response to driver inputs is restricted if the movement violates a limited access area of the golf course. A limited access controller 12 determines limited access area violations by comparing golf cart position determined from a GPS receiver 14 with limited access areas defined in a limited access map 16. Limited access map 16 stores limited access areas as geographic perimeters and golf cart movement restrictions associated with golf cart positions within the geographic perimeters. Typical limited access areas within a golf course are greens, tees, wet fairways, sand traps, water traps, areas in which driving a golf cart causes damage to the golf course grounds, and areas in which driving a golf cart presents a danger to the driver or others, such as sharp turns, steep hills and crowded parking areas. In some instances, limited access areas exclude substantial portions of a golf course from golf cart movements, such as when a course is wet and golf carts are limited to use on golf cart paths, and the extent of the limited access areas may change during the course of a day. The type of golf cart movement restrictions may vary for different limited access areas to include, for example, a prohibition of any movement, a limitation of movement to a reduced speed, or a limitation of movement in restricted directions, such as reverse.

One illustrative example of limited access areas and associated movement restrictions applied by limited access controller 12 is a golf green 18, approach 20 and fairway 22, and a prohibition against driving into the approach 20 or anywhere within the perimeter of golf green 18. Movement by golf cart 10 is restricted if limited access controller 12 analyzes the position provided by GPS receiver 14, or a dead reckoning position estimate based on the last GPS position, and determines that the likelihood of golf cart 10 entering a limited access area exceeds a given threshold. For instance, if the position provided by GPS receiver 14 matches a position within green 18, the limited access area associated with green 18 is violated and movement by the golf cart is prevented to reduce the risk of damage to green 18. In a situation in which a golf cart actually traverses a green, a complete shutdown of the golf cart may be warranted so that the golf course marshal may personally instruct the golf cart driver on golf course rules.

Ideally, however, movement of golf cart 10 is restricted before the golf cart position reaches the perimeter of green 18. For instance, within a predetermined distance of green 18, limited access controller 12 reduces the maximum available speed of golf cart 10 and notifies the driver with a message and/or audible alert if the projected path of golf cart 10 will traverse green 18 or approach 20. The path of golf cart 10 is projected from a velocity vector derived by one or more of change of GPS position over time, dead reckoning and the speed selected by the driver. If the GPS position of golf cart 10 enters into approach 20, the available speeds of golf cart 10 are restricted, such as to selections like reverse gear that will result in a velocity vector out of the approach without crossing into green 18, and the driver is alerted to proceed from the limited access area in an appropriate manner. Alternatively, the maximum speed available is decreased by greater amounts as the distance of the golf cart to green 18 decreases until all movement is prohibited at the edge of the green. In this manner, the risk is reduced of a violation of green 18 with a positioning of golf cart 10 within the perimeter of green 18 by layering limited access layers to have escalating movement restrictions as golf cart 10 moves closer to green 18. The selected actions or set of actions are configurable and decided by the course manager based on course rules and preferences.

Limited access controller 14 enforces restrictions on movement by golf cart 10 by communicating with an on-board motor controller 24 for motor 26. For instance, limited access controller 14 operates on a Windows CE platform and communicates with a serial port of a 1510 motor controller manufactured by Curtis PMC. The 1510 motor controller allows polling of its configuration settings, such as speed settings, and its status information, such as throttle setting, battery voltage and motor operating parameters, so that limited access controller 14 is able to override driver inputs, such as throttle settings input through an accelerator pedal 28. For instance, applying the above example, if limited access controller 12 detects that golf cart 10 has entered within the perimeter of green 18, it may disable movement of golf cart 10 by commanding on board controller 24 to override driver accelerator inputs, to override ignition inputs, to override gear selection inputs or by setting the maximum setting of motor 26 to a speed of zero. Alternatively, limited access controller 12 interfaces with a power switch 30 to shut off main current from a battery 32 to motor 26.

Limited access controller 12 interfaces with the driver of golf cart 10 and with golf course management through a driver interface unit 34, a driver display 38 and a communication module 36. Driver interface unit 34 presents limited access information to a driver of golf cart 10 visually through display 38 and audibly through speaker 40. Driver inputs in response to limited access information is provided through an input interface 42, such as a touch screen or buttons associated with display 38, and through an emergency override 44 that allows a driver to override restrictions on movement of golf cart 10 imposed by limited access controller 12. Communications module 36 communicates with a base station to allow centralized tracking of golf cart movement and status, updates to limited access map 16, and direct override from the base station of driver inputs. Applying the above example, as limited access controller 12 restricts driver inputs through accelerator 28, messages from driver interface unit 34 are presented at display 38. Slowing of the maximum speed as golf cart 10 approaches approach 20 is accompanied with a caution message explaining the reduced speed is to avoid any encroachment on approach 20 or green 18. Disabling of forward movement based on a golf cart position over approach 20 is accompanied with an audible alert and caution message explaining that golf cart 10 has violated a course rule and may only be operated in reverse. A golf cart position over approach 20 or green 18 also results in a message sent through communication module 36 to alert appropriate golf course management of the violation, such as the marshal. The driver can obtain additional help through input interface 42 or, in the event of an emergency, can override certain restrictions imposed by limited access controller 12 through activation of emergency override interface 44, such as to make a more rapid return to cover in the event of an electrical storm.

Figure 2:
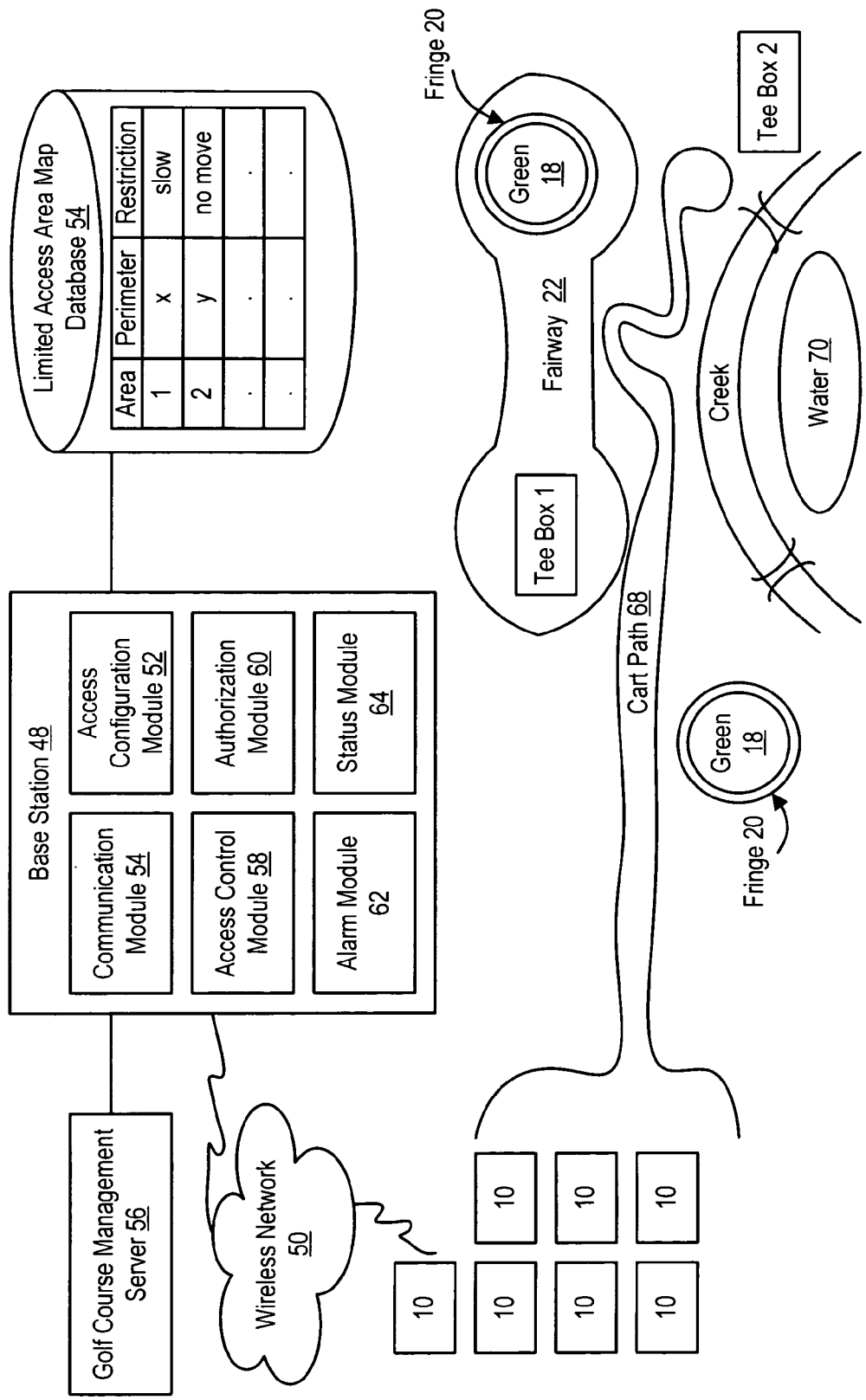
FIG. 2 depicts a functional block diagram of a golf course system for control of golf cart movement.

Referring now to FIG. 2, a functional block diagram is depicted of a golf course system for control of movement of golf carts 10 on a golf course 46. Overall golf course management is provided by a base station 48 that communicates with golf carts 10 through a wireless network 50. Base station 48 defines limited access areas and associated golf cart movement restrictions with an access configuration module 52 that maintains a limited access area map database 54. Limited access area map database 54 relates limited access areas to perimeters having geographic coordinates and to movement restrictions such as slow, no movement or reverse only movement. By maintaining defined limited access areas, database 54 simplifies implementation of golf cart restrictions as conditions warrant. For instance, if a brief rainstorm dampens a portion of the course, the marshal selects a stored golf cart only movement restriction for the wet areas and communicates the updated limited access areas to golf carts 10 through communication module 54 and wireless network 50. Remote design and selection of limited access areas is supported through a golf course management server 56 that, for instance, allows interaction with access configuration module 52 from a local area network or the Internet. The modules and database for the depicted system may be implemented with multiple and distributed computer systems.

In addition to supporting the design and selective activation of limited access areas, base station 48 provides a centralized communication hub for control of golf carts across golf course 46. An access control module 58 interacts with individual golf cart limited access controllers 12 to directly control functions of that golf cart's motor 26. As an example, golf carts in a parking area 66 are prevented from movement by a command communicated from access control module 58 that disconnects main power to each motor to prevent theft of the golf carts. When a driver pays for a round of golf, the driver is provided with an authorization code that the driver inputs through input interface 42 for communication to an authorization module 60 of base station 48. If the driver authorization code matches the authorization code of authorization module 60, access control module 58 is commanded to release the authorized golf cart for movement. During movement around the golf course, an alarm module 62 tracks limited access area violations reported from golf carts through communication module 54 and status module 64 tracks golf cart status based on information processed by limited access controllers 12 from on board controllers 24. Thus, for instance, a marshal may impose movement restrictions on selected golf carts through base station access control module 58 based on status and alarm information.

Position-based movement restrictions for golf carts on a golf course 46 provide enhanced play, safety, and course upkeep by limiting golf carts to authorized use. Improved play begins with player check in by ensuring that only authorized players have access to golf carts 10 taken from parking area 66. Parking area 66 is a limited access area which permits golf cart movement within the defined perimeter only at a reduced maximum speed to promote safe driving. Further, each golf cart 10 may have a limited access area defined within a predetermined radius so that, when two carts are in proximity to each other a reduced maximum speed is enforced. As golf carts proceed along golf cart path 68 a number of limited access areas may apply, including cart path only access during wet conditions, and reduced speeds applied proximate to sharp turns, steep hills or dangerous driving conditions such as cliffs and water hazards. The specific limited access periods applicable for a golf course 46 may change daily or even through out a day such as when water hazards 70 change dimensions or conditions on fairway 22 change, and may also vary based on the quality of GPS or dead reckoning position accuracy. In the event of an emergency, a driver may override specific limited access controller restrictions for that driver's golf cart, or alternatively, a message from the base station may disable all or selected limited access controller functions for all or selected golf carts, such as if lightening threatens the golf course.

Figure 3:
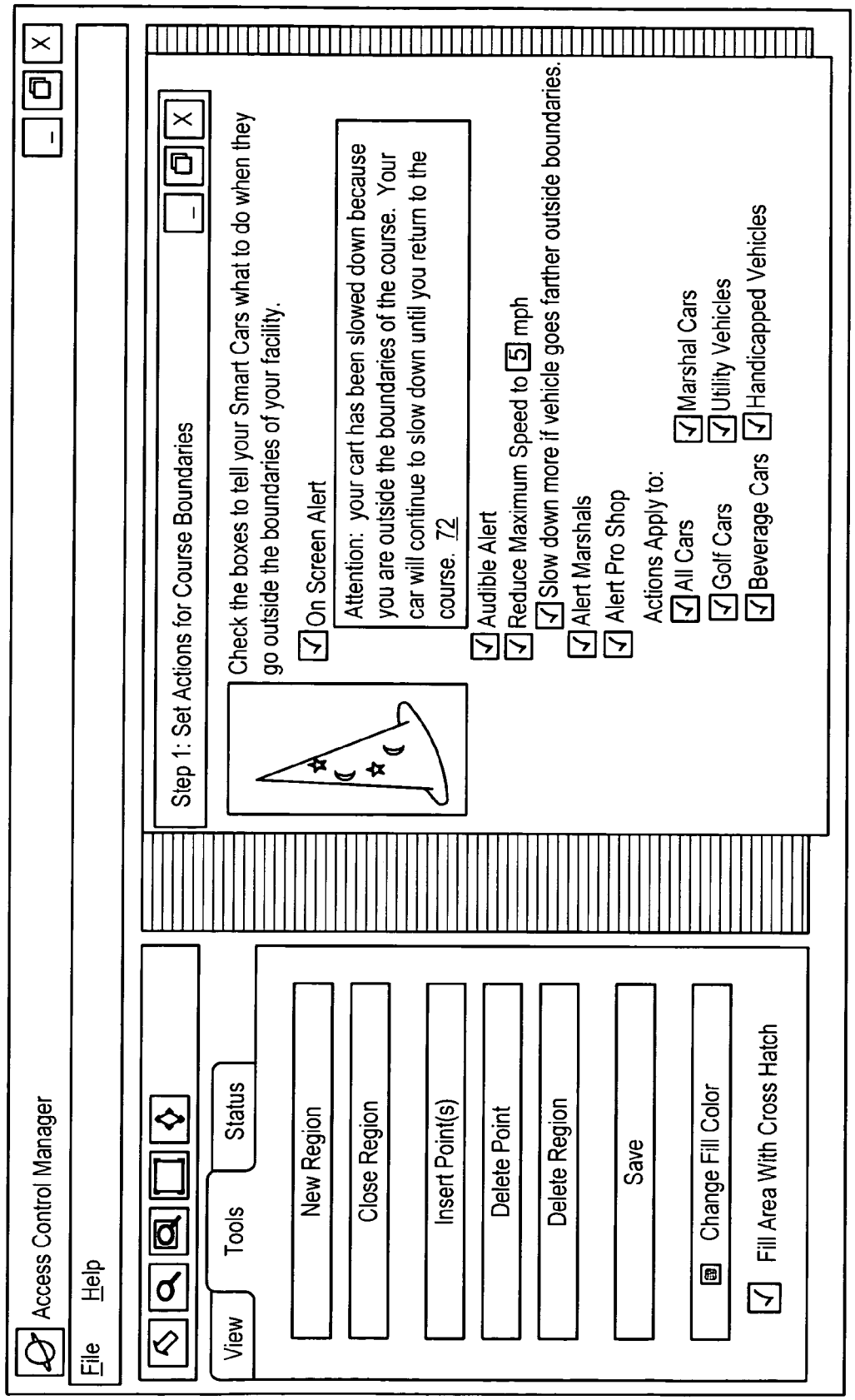
FIG. 3 depicts an example of a graphical user interface for configuring limited access areas of a golf course.

Referring now to FIG. 3, one example of a graphical user interface is depicted in which access configuration module 52 defines movement beyond the boundaries of a golf course as movement into a limited access area. A message box 72 provides a text message for display to a driver if the limited access area, i.e., travel outside of the golf course boundary, is violated. An audible alarm is selected along with a restriction of maximum speed to 5 MPH. In one embodiment, maximum speed is further reduced as the golf cart continues movement into the limited access area, such as if the velocity vector of the golf cart increases the distance of the golf cart from the golf course boundary. Alerts of a limited access area violation are provided to the marshal and pro shop based on the type of golf cart that is violating the limited access area. In the depicted example, an alarm is provided for all types of vehicles since movement out from the boundary of the golf course indicates a possible vehicle theft. In alternative limited access areas, different types of defined areas, such as greens and driving ranges, may have different selections for different types of golf carts. For instance, the marshal and utility carts may be permitted to cross the driving range whereas other types of carts, such as player or beverage carts, are limited from such movement for safety reasons. As another example, a handicap vehicle and a mower are allowed on a green while all other types of vehicles are prohibited. The type of golf cart is predefined based on golf cart identifiers or alternatively set with an access code input by the driver. Once the limited access area is defined by access configuration module 52, it is stored in limited access area map database 54 and, in one embodiment, may be deployed through wireless network 50 to all or selected golf carts.

Figure 4:
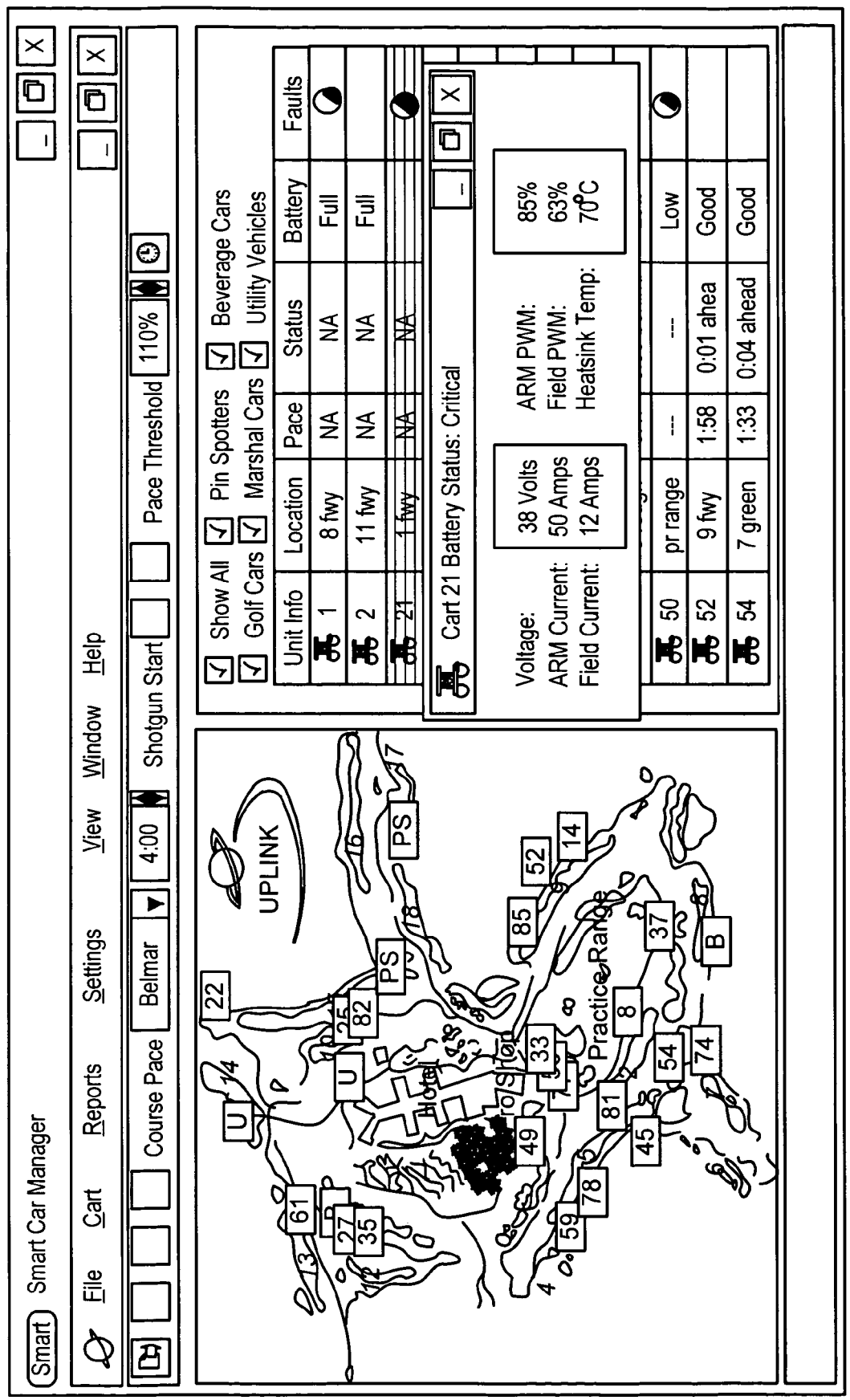
FIG. 4 depicts an example of a graphical user interface for display of golf carts in play on a golf course.

Referring now to FIG. 4, a graphical user interface is depicted as an example of the status presentation available from status module 64. Each active golf cart is identified by a cart number with position, playing pace, playing status, battery charge and fault information displayed in a tabular format. More specific information about a selected golf cart is displayed automatically if a critical situation arises or by selection of the golf cart identifier. For instance, golf cart 21 has a pop-up window that displays a critical battery status. If a golf cart violates a limited access area, the violation is highlighted by a different color, such as yellow or red, and in the case of critical violations, such as violation of a green or a selection of an emergency override by the driver, the golf cart is identified with a pop-up window. The golf course map is presented at the base station or a display in a marshal's cart to provide an intuitive and easy to understand presentation that allows a marshal or other golf course management to quickly assess the status of all golf carts in play. In alternative embodiments, the golf cart limited access controller and management system described herein may be used to control the movement of other types of vehicles, such as construction vehicles at a construction site, delivery vehicles, maintenance vehicles, etc . . . , to improve the efficiency, safety and security of vehicle use.

Although the present invention has been described in detail, it should be understood that various changes, substitutions and alterations can be made hereto without departing from the spirit and scope of the invention as defined by the appended claims.

What is claimed is:

1. A system for control of a golf cart on a golf course, the golf cart having a motor for moving the golf cart, the motor responding to driver commands input through an on board controller, the system comprising:
   a GPS receiver operable to determine the golf cart position on the golf course;
   a limited access map defining limited access areas of the golf course; and
   a limited access controller interfaced with the GPS receiver and the limited access map, the limited access controller operable to override a driver command to move the golf cart to violate a limited access area.

2. The system of claim 1 wherein the limited access controller overrides a driver input by governing the maximum speed commanded through the on board controller.

3. The system of claim 1 wherein the limited access controller overrides a driver input by preventing a command by the on board controller to the motor that moves the golf cart into the limited access area.

4. The system of claim 3 wherein the driver input comprises an accelerator input to advance the golf cart forward along a vector that intercepts a limited access area in a predetermined warning distance and wherein the limited access controller overrides the accelerator input to prevent forward motion along the vector.

5. The system of claim 4 wherein the limited access area comprises one or more of a golf green, tee, fairway or hazard.

6. The system of claim 1 wherein the limited access area comprises a golf cart path having a turn, the turn having a radius with a predetermined maximum safe speed, the limited access controller commanding the on board controller to override driver inputs to exceed the predetermined maximum safe speed.

7. The system of claim 1 further comprising a driver interface unit operable to present limited access areas to a driver of the golf cart, the driver interface unit further operable to present a message to the driver if the limited access controller commands an override of a driver input.

8. The system of claim 7 wherein the driver interface unit is further operable to send notice to golf course personnel of a driver input to move the golf cart to violate a limited access area.

9. The system of claim 8 wherein the driver interface unit is further operable to accept a notice sent by golf course personnel to disable the limited access controller.

10. The system of claim 1 wherein the limited access controller is further operable to accept a pass code that permits driver inputs to move the golf cart to violate a limited access area.

11. A method for controlling golf cart movement on a golf course, the method comprising:
   monitoring the golf cart position with a GPS receiver;
   comparing the golf cart position with a limited access map that defines limited access areas of the golf course;
   determining a golf cart violation of a limited access area;
   restricting the performance of golf cart driver commands by the golf cart motor to inhibit violation of the limited access area by the golf cart.

12. The method of claim 11 further comprising:
   presenting at the golf cart a notice to the driver of violation of the limited access area.

13. The method of claim 12 wherein presenting a notice further comprises displaying instructions for avoiding the limited access area.

14. The method of claim 11 wherein determining a golf cart violation of a limited access area further comprises:
   determining that the golf cart GPS position is within a predetermined distance of the limited access area;
   estimating the velocity of the golf cart; and
   analyzing the golf cart position and velocity to project a path for the golf cart through the limited access area.

15. The method of claim 14 wherein estimating the velocity further comprises:
   polling the golf cart motor to determine the selected motor speed; and
   analyzing the change in GPS position of the golf cart over time.

16. The method of claim 11 wherein restricting the performance of golf cart driver commands further comprises removing power from the golf cart motor.

17. The method of claim 11 wherein restricting the performance of golf cart driver commands further comprises restricting the maximum speed at which the motor can operate.

18. The method of claim 11 wherein restricting the performance of golf cart driver commands further comprises:
   disabling golf cart movement towards the limited access area;
   determining that the golf cart has moved a predetermined distance from the limited access area; and
   re-enabling the performance of golf cart driver commands.

19. The method of claim 18 wherein disabling golf cart movement towards the limited access area further comprises disabling golf cart movement except in a reverse direction.

20. The method of claim 11 further comprising:
   displaying an emergency override at the golf cart;
   selecting the emergency override; and
   re-enabling the performance of golf cart driver commands to allow golf cart movement through the limited access area.

21. A system for control of plural golf carts on a golf course, the system comprising:
   a GPS receiver associated with each golf cart and operable to determine a GPS position of an associated golf cart;
   a limited access map associated with each golf cart and defining limited access areas of an associated golf cart;
   a limited access controller associated with each golf cart and interfaced with the GPS receiver and limited access map, the limited access controller operable to limit the performance of driver commands to move an associated golf cart in a limited access area based at least in part on a GPS position of the associated golf cart;
   a driver interface unit associated with each golf cart and interfaced with the limited access controller, the driver interface unit operable to communicate with a wireless network; and
   a base station operable to communicate with the driver interface unit over the wireless network, the base station having an access configuration module operable to define limited access areas and to update one or more of the limited access maps with the defined limited access areas.

22. The system of claim 21 wherein a limited access area comprises a perimeter and a golf cart movement restriction associated with a golf cart position within the perimeter.

23. The system of claim 22 wherein the perimeter is associated with a golf course green and the golf cart movement restriction comprises overriding forward motion by the golf cart onto the green.

24. The system of claim 22 wherein the perimeter is associated with a golf course driving hazard and the restriction comprises overriding driver commands for a speed that exceeds a predetermined maximum speed.

25. The system of claim 22 wherein the perimeter is associated with other golf carts and the restriction comprises governing the maximum golf cart speed.

26. The system of claim 21 wherein the driver interface unit is further operable to communicate to the base station an alarm of a driver command to move a golf cart in a limited access area.

27. The system of claim 26 wherein the base station further comprises an access control module operable to communicate to the driver interface unit an authorization to perform the driver command to move a golf cart in the limited access area.

28. The system of claim 21 wherein the base station further comprises an access control module operable to communicate to one or more selected driver interface units a movement restriction for the golf cart associated with each of the one or more select driver interface units.

29. The system of claim 28 wherein the base station further comprises an authorization module operable to communicate a request for an authorization code to a driver interface unit and to verify receipt of the authorization code from the driver interface unit, the authorization module commanding the access control module to prohibit movement of the golf cart until receipt of the authorization code.

30. The system of claim 29 wherein the authorization code is associated with payment of a green fee for playing the golf course.

31. The system of claim 21 wherein the access configuration module is further operable to define limited access areas according to golf cart driver type.

32. The system of claim 21 wherein the access configuration module is further operable to restrict golf carts to golf cart paths.

33. The system of claim 21 wherein the access configuration module is further operable to restrict golf cart movement by one or more predetermined time periods.

* * * * *

Disclaimer

7,239,965 B2 — David J. Wehrlen, Austin, TX (US); Joseph M. Hill, III, Austin, David J. Mullinix, Austin, all of TX (US). METHOD AND SYSTEM FOR GOLF CART CONTROL. Patent dated July 3, 2007. Disclaimer filed April 27, 2018, by the assignee, CLUB CAR, LLC.

Hereby disclaims the complete claim 20 of said patent.

*(Official Gazette, March 30, 2021)*

Disclaimer

7,239,965 B2 - David J. Wehrlen, Austin, TX (US); Joseph M. Hill, III, Austin, TX (US); David J. Mullinix, Austin, TX (US). METHOD AND SYSTEM FOR GOLF CART CONTROL. Patent dated July 3, 2007. Disclaimer filed April 27, 2018, by the assignee, Club Car, LLC.

I hereby disclaim the following complete claim 20 of said patent.

*(Official Gazette, September 6, 2022)*

(12) INTER PARTES REVIEW CERTIFICATE (1888th)
United States Patent
Wehrlen et al.

(10) Number: US 7,239,965 K1
(45) Certificate Issued: Feb. 9, 2021

(54) METHOD AND SYSTEM FOR GOLF CART CONTROL

(75) Inventors: David J. Wehrlen; Joseph M. Hill, III; David J. Mullinix

(73) Assignee: CLUB CAR, LLC

Trial Numbers:

IPR2017-02141 filed Sep. 27, 2017
IPR2017-02142 filed Sep. 27, 2017

Inter Partes Review Certificate for:

Patent No.: 7,239,965
Issued: Jul. 3, 2007
Appl. No.: 10/754,916
Filed: Jan. 9, 2004

The results of IPR2017-02141 and IPR2017-02142 are reflected in this inter partes review certificate under 35 U.S.C. 318(b).

INTER PARTES REVIEW CERTIFICATE
U.S. Patent 7,239,965 K1
Trial No. IPR2017-02141
Certificate Issued Feb. 9, 2021

AS A RESULT OF THE INTER PARTES REVIEW PROCEEDING, IT HAS BEEN DETERMINED THAT:

Claims 1-19 and 21-33 are found patentable.

Claim 20 is disclaimed.

\* \* \* \* \*